United States Patent
Oka

[15] 3,664,468
[45] May 23, 1972

[54] SELF FORCE-INCREASING DISK BRAKE

[72] Inventor: Hiroyuki Oka, Toyota-shi, Japan
[73] Assignee: Toyota Jidosha Kogyo Kabushiki Kaisha, Aichi-ken, Japan
[22] Filed: Jan. 5, 1970
[21] Appl. No.: 655

[52] U.S. Cl.............................188/72.2, 188/71.8, 188/72.6, 188/351
[51] Int. Cl.................................................F16d 55/48
[58] Field of Search....................188/72.2, 72.4, 72.6, 72.9, 188/71.8, 351, 346, 73.4, 72.7

[56] References Cited

UNITED STATES PATENTS

| | | | |
|---|---|---|---|
| 3,173,517 | 3/1965 | Powlas | 188/72.2 X |
| 1,726,517 | 8/1929 | Reynolds | 188/346 |
| 3,125,187 | 3/1964 | Dotto | 188/351 |
| 3,211,261 | 10/1965 | Chouings | 188/72.9 |
| 3,261,430 | 7/1966 | Wilson et al. | 188/73.6 |
| 3,367,452 | 2/1968 | Baynes | 188/72.9 X |

FOREIGN PATENTS OR APPLICATIONS

| | | | |
|---|---|---|---|
| 951,602 | 3/1964 | Great Britain | 188/346 |

*Primary Examiner*—George E. A. Halvosa
*Attorney*—Harry G. Shapiro

[57] ABSTRACT

A disk brake is provided with means for intensifying the braking pressure. A friction member for engagement with a side of a rotary disk is fixed to a plate which is mounted at the front end of piston means for movement therewith and in a lateral direction. A pivoted lever is related to the plate so that one arm of the lever is cooperable with a side of the plate and a second arm is cooperable with the rear end of the piston means. When the piston means is actuated to cause engagement of the friction member with the side of the rotating disk, the friction member, which is moved laterally by virtue of its frictional engagement with the rotating disk, carries the plate with it and causes the plate to engage and rotate the lever, thereby causing the lever to exert an increased braking pressure upon the piston means and its associated friction member.

Also, means is provided to compensate for the wear of the friction member or members; and the means is provided for maintaining the brake in engaged or parked condition.

18 Claims, 2 Drawing Figures

PATENTED MAY 23 1972

INVENTOR.
HIROYUKI OKA
BY Harry G. Shapiro
ATTORNEY

SELF FORCE-INCREASING DISK BRAKE

The invention relates to disk brakes suitable for use in connection with any type of vehicle, and is more particularly directed to improvements in disk brakes for automobiles.

BACKGROUND OF THE INVENTION

It is known that disk brakes furnish maneuvering stability when the brake is applied in a moving vehicle such as an automobile. However, unlike brakes of the drum type, it has been virtually impossible to intensify the braking torque of disk brakes without resorting to a prohibitively expensive additional device such as a brake booster.

Another problem in the art of disk brakes has been the problem of providing a suitable parking brake. Also, it has been desirable to provide a disk brake with simple means to compensate for the wear of the friction member or members which are engageable with the sides of the disks.

SUMMARY OF THE INVENTION

In accordance with the invention, a disk brake is provided which has related thereto or incorporated therein a self-braking-pressure intensifying means which is of simple construction, effective and reliable in operation and comparatively inexpensive to manufacture.

In accordance with the preferred embodiment of the invention, means is provided to compensate for the wear of the friction members. Also, a simple and effective means is provided to maintain the brake in engaged position when the vehicle is stationary or parked.

In the disk brake of the iNvention, the friction member which engages a side of the rotary disk is fixed to a plate. The plate is situated at the front end of piston means so that the friction member-plate unit may move with the piston means and laterally of the plane of movement of the piston means. A pivoted lever is related to the plate and to the piston means so that one arm of the lever is cooperable with one side of the laterally movable plate and the second arm of the lever is cooperable with the rear end of the piston means.

The foregoing relationship of friction member-plate unit, piston means and lever provides a circuit for intensifying the braking pressure upon the rotary disk. When the piston means is actuated by hydraulic pressure to cause engagement of the friction member with a side of the rotating disk, the friction member has lateral movement imparted thereto in the direction of rotation of the disk. The laterally movable plate to which the friction member is fixed engages one arm of the pivoted lever causing the lever to rotate and the other lever arm to exert pressure upon the piston means and the associated friction member, thereby intensifying the braking pressure.

To provide the intensified braking action where the disk is rotatable in both or opposite directions, a second pivoted lever is provided for coaction with the opposite side of the plate which, as indicated, is movable in a lateral direction as well as in the plane of movement of the piston means. The second lever also has an arm cooperable with the rear end of the piston means.

To afford increased braking power, a second friction member is positioned for engagement with the opposite side of the disk. The second friction member is fixed for movement with a pivoted yoke which also serves as a support for the piston means and the pivoted levers.

In accordance with a more specific aspect of the invention, and to compensate for the wear of the friction member or members, the piston means comprises a main cylinder having a main piston positioned therein. The main piston has a central bore within which is fitted an auxiliary piston. A passage for a hydraulic or brake fluid connects a first chamber defined by the auxiliary piston, the main piston and the main cylinder and a second chamber provided by the auxiliary piston and the main piston. A one-way valve is positioned in the passage to allow hydraulic fluid to flow from the first chamber to the second chamber but not in a reverse direction. The rear end of the auxiliary piston is cooperable with an arm of the pivoted lever, or the respective arms of both levers, the other arm or arms of the levers being cooperable with the side or opposite sides of the laterally movable plate.

In accordance with another aspect of the invention, a parking brake is provided by simply connecting means for manually rotating the lever cooperable with the piston means.

The foregoing objects, and improved results furnished by the disk brake of the invention will be apparent from the following description of a preferred embodiment of the invention, taken in conjunction with the drawings.

DESCRIPTION OF THE PREFERRED EMBODIMENT

Figure 1:
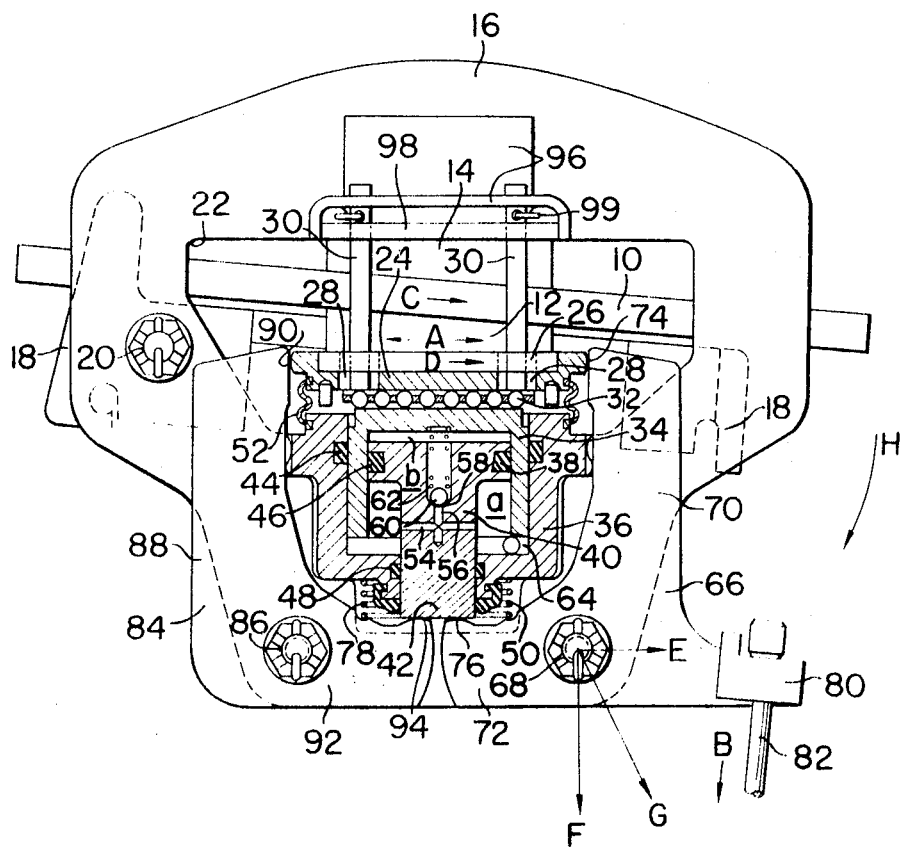
FIG. 1 is a plane view of a disk brake made in accordance with the invention, with certain of the parts broken away and shown in cross section.

The disk brake of the invention will be described with reference to its use in an automobile. Referring to the drawings, a disk brake in accordance with the invention comprises a rotary disk 10 secured to a wheel (not shown) for rotation therewith. A friction member 12 is disposed for engagement with a side of the disk. To brake the rotary disk by coacting with the first friction member and to furnish increased frictional surface area, a second friction member 14 may be positioned for engagement with the opposite side of the disk.

The components of the brake assembly are supported by a yoke 16. The yoke is connected to a bracket 18 which in turn is fixed to a stationary member such as a knuckle steering or axle housing of the automobile (not shown). Preferably, and as shown in FIG. 1, the yoke is pivotally mounted, and for this purpose, a headed pivot pin 20 is extended through an opening in the yoke and secured to the bracket. The yoke is provided with an aperture 22 through which extends the peripheral portion of the rotary disk 10. The friction members 12 and 14 are mounted for engagement with the opposite sides of the disk's peripheral portion.

The friction member 12 is fixed to a backing plate 26 by any suitable means such as a bonding agent. A plate 24 may be provided with a recess within which the backing plate 26 is positioned. The friction member-plate unit is mounted at the front end of piston means for movement therewith and laterally of the plane of movement of the piston means. A pair of laterally spaced, laterally elongated slots 28 extend through the plate 24 and the backing plate 26 near the sides thereof. A pair of laterally spaced pins 30 extend through the slots to guide the plate 24 and the friction member 12 fixed to the backing plate 26 for lateral movement. A thrust bearing 32 which enables lateral movement of the plate-friction member assembly in the directions indicated by the double-pointed arrow A (FIG. 1) is interposed between the rear surface of the plate 24 and the front end of the piston means.

In accordance with the illustrated preferred embodiment of the invention, the piston means comprises a main piston 34 fitted for reciprocation in a cylinder 36. The cylinder is supported by the yoke 16. The cylinder may be formed integrally with the yoke or it may be separately made and connected to the yoke by a pressure fit or bolted in place. The main piston is provided with a central bore 38 within which an auxiliary piston 40 is fitted. The rear end 42 of the auxiliary piston extends through a suitably sealed opening in the lower end of the cylinder 36. As shown in FIG. 1, the cylinder and pistons are provided with fluid sealing rings 44, 46 and 48, and dust sealing boots 50 and 52 are provided intermediate the auxiliary piston and the cylinder and between the cylinder and the plate 24, respectively.

As shown in FIG. 1, a chamber $a$ defined by one side of the auxiliary piston 40, the main piston 34 and the cylinder 36 is in flow communication with a chamber $b$ defined by the front side of the auxiliary piston and the main piston 34. The sealing ring 46 prevents the flow of fluid between the head of the auxiliary piston and the adjoining internal wall of the main piston. Flow communication is provided between the chambers $a$ and $b$ by a passage which comprises a transverse opening 54 extended through the stem portion of the auxiliary piston which is in communication with a vertically extending opening 56. The opening 56 is provided with a counter-bore of larger diameter to provide a seat 58 for a ball valve 60. The ball is urged against the seat by a coiled compression spring 62. The arrangement is such that the ball valve normally closes the passage between the chambers $a$ and $b$ and provides a one-way valve permitting the flow of hydraulic fluid in the direction from the chamber $a$ to the chamber $b$ but not in a reverse direction. A brake or hydraulic fluid line 64 is in communication with the chamber $a$ for transmitting hydraulic pressure from a suitable source (not shown) as when the brake pedal in an automobile is pressed down.

The valve spring 62 exerts a relatively weak force upon the ball valve 60, and the spring force is a function of the resistances caused by the relative sliding movements of the main and auxiliary pistons 34, 40 and the cylinder 36, and the hydraulic pressure receiving area of the ball valve 60 in the passage. The force exerted by the valve spring on the ball valve is such that when the brake is applied, the passage between the chambers $a$ and $b$ is opened prior to the actuation of the auxiliary piston 40 which then actuates the main piston 34 to move it forward.

The means for intensifying the braking pressure includes a lever 66 in circuit with the plate 24 and the rear end 42 of the auxiliary piston 40. The lever is pivotally connected to the yoke 16 as by a headed pivot pin 68 which extends through an opening in the lever and is secured to the yoke. The lever has a pair of arms 70 and 72 on opposite sides of the fulcrum provided by the pivot pin. One end 74 of the arm 70 is positioned adjacent the side of the plate 24 for cooperation therewith. The end 76 of the second arm 72 is positioned for cooperation with the rear end 42 of the auxiliary piston. A return spring 78 is interposed between the wall of the cylinder 36 and the lever arm 72.

The lever 66 is provided with an extension 80 through which a headed wire 82 is extended to furnish manual means for actuating the lever. Upon pulling the wire 82 in the direction of the arrow B (FIG. 1), the lever is rotated and coacts with the piston arrangement to maintain the brake in engaged or parked condition.

Where, as in automobiles, the rotary disk 10 is mounted for rotation in both or opposite directions, a second lever 84 is related to the laterally movable plate 24 and the rear end 42 of the auxiliary piston. As shown in FIG. 1, the lever 84 is pivotally connected to the yoke 16 as by a headed pivot pin 86. The second lever, like the first lever, has an arm 88 on one side of the pivot pin, the end of which 90 is positioned adjacent the opposite side of the plate 24. The second arm 92 has an end 94 for cooperation with the rear end 42 of the auxiliary piston. As shown, the same return spring 78 is cooperable with both levers 66 and 84.

In order to brake the rotary disk by coacting with the first friction member and furnish increased frictional surface area for coaction with the rotary disk 10, the second friction member 14 is positioned for engagement with the opposite side of the disk. The friction member 14 is fixed for movement with the yoke 16 which, as previously indicated, preferably is pivotally connected to the stationary bracket 18.

The aforementioned guide pins 30 extend between and have their ends respectively supported in openings of a flange provided by the cylinder 36 and the supporting member 96 fixed to the yoke by any suitable means such as by welding or by a bolting of the parts. The friction member 14 is fixed to a backing plate 98 by any suitable means such as bonding agent.

Figure 2:
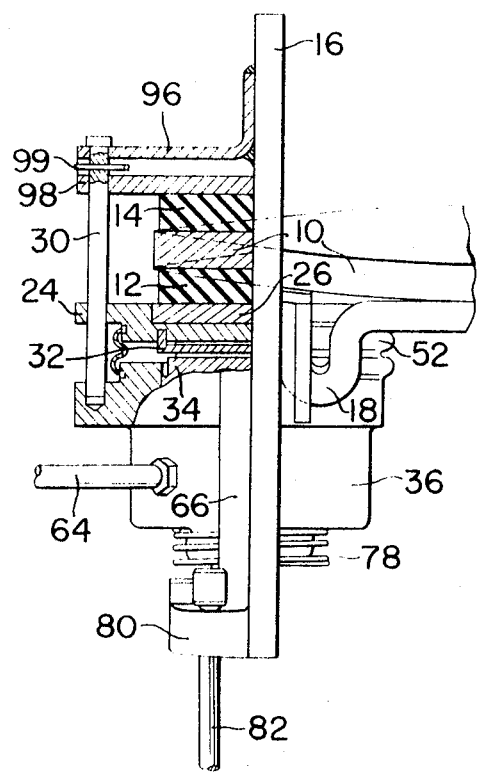
FIG. 2 is a side view of the brake, partly in cross section, as viewed from the right side of FIG. 1.

As shown in FIG. 2, the backing plate 98 provided with the friction member 14 is hung slidably on the said guide pins 30 extended through openings near bath ends thereof. In order to prevent the guide pins from coming off, cotter pins 99 are inserted respectively in openings with which the guide pins 30 are provided between the supporting member 96 and the backing plate 98.

With a hydraulic or brake fluid in the system, the brake assembly operates in the following manner. With the disk 10 rotated in the direction indicated by the arrow C (FIG. 1), the brake, when applied, causes hydraulic pressure to be imparted to the main piston 34 to cause the friction member 12 to be pressed against the side of the rotating disk. The frictional engagement of the friction member with the side of the disk causes the friction member to move laterally in the direction of the arrow D (FIG. 1), thereby carrying with it the plate 24 to which it is fixedly secured. As a result, the side of the plate engages the end 74 of the lever 66 causing the lever to be rotated about its fulcrum at 68. Such rotation of the lever causes the end 76 of the arm 72 to exert pressure against the rear end 42 of the auxiliary piston 40, thereby intensifying the pressure upon the main piston and the pressure of the friction member 12 against the side of the rotating disk.

When the disk 10 is rotated in the opposite direction and the brake is applied, the friction member 12, which has been brought into engagement with the side of the disk, is moved laterally in the direction of rotation of the disk (opposite to the direction of the arrow D) to cause the plate 24 to be shifted laterally in such direction. As a result, the opposite side of the plate 24 engages the end 90 of the lever arm 88 causing the lever 84 to be rotated about the fulcrum provided by the pivot pin 86, thereby causing the end 94 of the lever arm 92 to press against the rear end 42 of the auxiliary piston. The hydraulic pressure in the chamber $b$ upon the main piston 34 is intensified to thereby increase the pressure of the friction member 12 against the rotating disk.

Where, as illustrated, a second friction member 14 is provided, and by virtue of the pivotal mounting of the yoke 16 to which the second friction member is fixed and to which the lever or levers are pivotally connected, the friction member 14 is pressed into engagement with the opposite side of the disk 10 when the cylinder 36 is moved downwardly by the fluid pressure in the chamber $a$ and either the lever 66 or the lever 84 is rotated about its fulcrum, as above described. With reference to the lever 66, when the side of the plate 24 engages the end 74 to rotate the lever, there is a reaction force imposed upon the fulcrum of the lever in the direction indicated by the arrow E (FIG. 1) and another reaction force is provided to the fulcrum of the lever 66 by the auxiliary piston 40 in the direction of the arrow F. Since the lever 66 is pivoted to the yoke 16, a resultant force in the direction of the arrow G is transmitted to the yoke causing the yoke to be rotated in the direction indicated by the arrow H about the yoke's center of rotation or pivotal mounting at 20. As a result, the friction member 14 which is fixed to the yoke is caused to be pressed against the adjoining peripheral portion of the rotating disk to thereby also act to retard the rotation of the disk. The same action occurs with regard to the other independent, pivotally mounted lever 84.

Upon release of the brake, the spring 78 acts upon the levers 66 and 84 to return them to neutral position to thereby cause the plate 24 to return to its initial, neutral position, whereupon the pressure of the friction members upon the disk is released. Manually pulling upon the wire 82 in the direction of the arrow B causes the lever 66 to be rotated and the yoke 16 to be rotated in the direction of the arrow H; hydraulic pressure in the chamber $b$ is imposed upon the main piston 34, thereby causing the friction member 12 to press against the disk and the friction member 14 to press against the opposite side of the disk and maintain the brake in engaged or parked condition.

The described main piston and auxiliary piston arrangement functions to compensate for wear of the friction members.

When hydraulic pressure is applied through the line 64, the ball valve 60 moves off its seat against the light, resilient pressure applied by the spring 62, thereby opening the passage between the chambers $a$ and $b$. The passage is opened prior to the actuation of the auxiliary piston 40. Thus, prior to the actuation of the auxiliary piston, hydraulic pressure is applied to the main piston, and the friction member 12 is pressed against the side of the disk 10 to cause the rotation of the disk to be retarded.

Due to the frictional engagement of the member 12 with the rotating disk, the member is moved laterally in the direction of rotation of the disk and causes the side of the plate 24 to engage the end 74 of the lever 66. The lever is rotated about its fulcrum and the end 76 of the lever is pressed against the end 42 of the auxiliary piston to actuate the auxiliary piston toward the friction member 12. The internal pressure within the chamber $b$ is increased so that there is a pressure differential between the chambers $a$ and $b$. The one-way valve arrangement prevents the flow of fluid from the chamber $b$ back into the chamber $a$. After the volume of fluid in the chamber $b$ reaches an amount enough for compensation for the wear of the friction members, the auxiliary piston 40, under pressure by the lever at its end 42 acts in unison with the main piston 34 to thereby intensify the pressure of the friction member 12 against the disk 10. This coaction of the main and auxiliary pistons is due to pressure within the chamber $a$, and pressing force from the arm 72 of the lever 66 or/and the arm 92 of the lever 84. Thus, the described arrangement also serves to compensate for the wear upon the friction member 12. Compensation for wear also is furnished for the friction member 14 because of the relationship of the second friction member, the yoke to which it is fixedly secured and the pivotal mounting of the yoke to which the levers are pivotally connected.

It is believed that the advantages and improved results of the disk brake assembly of the invention will be apparent from the foregoing detailed description of a preferred embodiment of the invention. While the illustrated and described preferred embodiment of the invention is applicable to a brake for a disk which is rotatable in both or opposite directions, and thereby includes a pair of independently mounted levers in circuit with opposite sides of a laterally movable plate and piston means, it will be apparent that only one lever may be used where the brake is related to a disk which is positively rotated in one direction. Also, while a pair of friction members for engagement with opposite sides of the disk is preferred, it is within the scope of the invention to omit the second friction member, or the friction member which is not directly fixed to the laterally movable plate cooperable with a lever. In addition, while it is preferred that the brake assembly include the described main piston and auxiliary piston arrangement to compensate for wear of the friction member or members, it is within the scope of the invention to eliminate the auxiliary piston and provide the main piston with a stem extending rearwardly of the piston's head portion, the rear end of the stem being cooperable with an adjoining end or ends of a lever or levers.

I claim:

1. A disk brake for vehicles comprising a rotary disk, a friction member for engagement with a side of the disk, a plate having the friction member fixed thereto, piston means, the plate being mounted at the front end of the piston means for movement therewith and laterally of the plane of movement of the piston means upon urging of the friction member when engaged with the rotary disk, and a pivoted lever having one arm engaged by a side of the plate and responsive to the lateral movement of the plate, and a second arm cooperable with the rear end of the piston means so that lateral movement of the plate is transmitted through the lever to the rear of the piston means to augment the force of the piston means on the plate.

2. A disk brake according to claim 1, wherein a thrust bearing is positioned intermediate the plate and the piston means, the plate is provided with laterally spaced, laterally elongated slots, and guide pins are extended through the slots.

3. A disk brake according to claim 1, wherein the piston means comprises a main cylinder having a main piston positioned therein, the plate being mounted on the front end of the main piston, the main piston having a central bore, an auxiliary piston fitted in the bore, the second arm of the lever being cooperable with the rear end of the auxiliary piston, a passage connecting a first chamber provided by the auxiliary piston, main piston and the main cylinder and a second chamber provided by the auxiliary piston and the main piston, a one-way valve in the passage to allow fluid to flow from the first chamber to the second chamber, and a fluid supply line in communication with the first chamber.

4. A disk brake according to claim 1, including spring means cooperable with the lever to urge the lever and the plate toward neutral position.

5. A disk brake according to claim 4, including means connected to the lever for manually rotating the lever.

6. A disk brake according to claim 1, including a second pivoted lever associated with the plate and the piston means, the second lever having an arm cooperable with the opposite side of the laterally movable plate and a second arm cooperable with the rear end of the piston means.

7. A disk brake according to claim 6, including a pivotally mounted yoke, the levers being pivotally connected to the yoke, and a second friction member engageable with the opposite side of the disk fixed for movement with the yoke.

8. A disk brake according to claim 7, wherein a thrust bearing is positioned intermediate the plate and the piston means, the plate is provided with laterally spaced, laterally elongated slots, and guide pins are extended through the slots.

9. A disk brake according to claim 8, including spring means cooperable with the levers to urge the levers and the plate toward neutral position, and means connected to one of the levers for manually rotating the lever and the yoke.

10. A disk brake according to claim 6, wherein the piston means comprises a main cylinder having a main piston positioned therein, the plate being mounted on the front end of the main piston, the main piston having a central bore, an auxiliary piston fitted in the bore, the second arm of each lever being cooperable with the rear end of the auxiliary piston, a passage connecting a first chamber provided by the auxiliary piston and the main cylinder and the second chamber provided by the auxiliary piston and the main piston, a one-way valve in the passage to allow fluid to flow from the first chamber to the second chamber, and a fluid supply line in communication with the first chamber.

11. A disk brake according to claim 10, including a pivotally mounted yoke, the levers being pivotally connected to the yoke, and a second friction member engageable with the opposite side of the disk fixed for movement with the yoke.

12. A disk brake according to claim 11, wherein a thrust bearing is positioned intermediate the plate and the main piston; wherein spring means is positioned intermediate the main cylinder and the second arm of each lever to urge the levers and the plate toward neutral position; and wherein means is connected to one of the levers for manually rotating the lever and its yoke.

13. The disk brake according to claim 1 further comprising support means for the piston means and wherein one end of the piston means is connected to the plate on the opposite side of the friction member, and the lever being L-shaped with two arms rotatably pivoted on the support means for the piston means, the arms of the lever respectively extending to the side of the plate and the rear end of the piston means.

14. The disk brake according to claim 13, wherein a pair of L-shaped levers are rotatably pivoted on the support means for the piston means, the levers disposed in symmetrical relation with respect to the longitudinal axis of the piston means, and each of the levers having two arms which respectively extend to the plate and to the rear end of the piston means to be cooperable therewith.

15. The disk brake according to claim 13, wherein the piston means comprises a hydraulic cylinder and a main piston and an auxiliary piston slidably fitting to each other, the main piston and auxiliary piston defining a chamber in the main piston, a one-way valve disposed in a passage in the auxiliary piston to permit fluid flow from a hydraulic pressure source to the chamber in the main piston, and sealing means disposed between the main piston and the hydraulic cylinder and between the main piston and auxiliary piston, the main piston being cooperable with the carrier plate, the auxiliary piston being cooperable with one arm of said L-shaped lever.

16. The disk brake according to claim 13, wherein the L-shaped lever is connected to manual means for effecting a rotary movement of the lever to urge the friction member to the disk.

17. The disk brake according to claim 16, wherein the piston means support member is movably mounted on a stationary portion of a vehicle to move in a direction substantially opposed to the advancing movement of the piston means, the piston means support member straddling the rotatable disk, the rotatable disk having opposing friction surfaces, and a second friction member between the disk and a portion of the piston means support member to engage the opposing friction surface of the disk.

18. The disk brake according to claim 17, wherein the piston means support member is pivotally mounted on a stationary portion of a vehicle to move substantially perpendicular to the friction surface of the disk.

* * * * *